(12) United States Patent
Wiest et al.

(10) Patent No.: US 9,162,291 B2
(45) Date of Patent: Oct. 20, 2015

(54) TOOL HEAD FOR USE IN MACHINE TOOLS

(75) Inventors: Rudolf Wiest, Besigheim (DE); Arthur Antoni, Loechgau (DE); Frank Stadler, Erdmannhausen (DE)

(73) Assignee: KOMET GROUP GMBH, Besigheim (DE)

(*) Notice: Subject to any disclaimer, the term of this patent is extended or adjusted under 35 U.S.C. 154(b) by 347 days.

(21) Appl. No.: 13/822,327

(22) PCT Filed: Aug. 17, 2011

(86) PCT No.: PCT/EP2011/064144
§ 371 (c)(1),
(2), (4) Date: Mar. 12, 2013

(87) PCT Pub. No.: WO2012/038158
PCT Pub. Date: Mar. 29, 2012

(65) Prior Publication Data
US 2013/0167695 A1     Jul. 4, 2013

(30) Foreign Application Priority Data
Sep. 24, 2010 (DE) .......................... 10 2010 041 336

(51) Int. Cl.
*B23B 29/034* (2006.01)
(52) U.S. Cl.
CPC ........... *B23B 29/034* (2013.01); *B23B 29/0345* (2013.01); *B23B 29/03425* (2013.01);
(Continued)
(58) Field of Classification Search
CPC .............. B23B 29/0345; B23B 29/034; B23B 29/03432; B23B 29/03435; B23B 29/03439; B23B 29/03442; B23B 29/03446; B23B 29/03467; B23B 29/03471; B23B 29/03489; B23B 29/03478; B23B 29/03482; B23B 29/03492

USPC .............. 82/1.4, 1.2; 408/161, 158, 168, 169, 408/170, 171
See application file for complete search history.

(56) References Cited

U.S. PATENT DOCUMENTS 4,011,025 A    3/1977   Kress
4,508,475 A *   4/1985   Peuterbaugh ................. 408/153
(Continued)

FOREIGN PATENT DOCUMENTS

DE     84 03 099.2     7/1885
DE     24 34 041     2/1976
(Continued)

OTHER PUBLICATIONS

Form PCT/ISA/237 Written Opinion of International Searching Authority dated Nov. 28, 2011 (8 pages).
(Continued)

*Primary Examiner* — Daniel Howell
*Assistant Examiner* — Nicole N Ramos
(74) *Attorney, Agent, or Firm* — Flynn, Thiel, Boutell & Tanis, P.C.

(57) ABSTRACT

A tool head for use in machine tools, has a main body which can be rotated around an axis of rotation. The tool head has a slide. The slide can be moved by means of a pull rod axially oriented in the main body. The slide can be fitted with at least one tool or one tool holder. At least one adjustable toothed plate is fixedly arranged on the slide. The toothed plate has a helical gearing functioning as a gear means for engaging with a helical gearing of the pull rod which is complementary thereto. The slide has an adjustment unit for moving the at least one toothed plate and the helical gearing thereof into the complementary helical gearing of the pull rod.

15 Claims, 5 Drawing Sheets

(52) U.S. Cl.
CPC .............. *B23C2260/04* (2013.01); *Y10T 82/12* (2015.01); *Y10T 82/125* (2015.01); *Y10T 408/8588* (2015.01); *Y10T 408/85895* (2015.01); *Y10T 408/858957* (2015.01)

(56) References Cited

U.S. PATENT DOCUMENTS

| | | | |
|---|---|---|---|
| 4,847,975 | A | 7/1989 | Santi |
| 5,120,167 | A * | 6/1992 | Simpson ..................... 408/158 |
| 5,655,422 | A | 8/1997 | Stolz et al. |
| 7,159,831 | B2 | 1/2007 | Gartner et al. |
| 2004/0164214 | A1 | 8/2004 | Gartner et al. |

FOREIGN PATENT DOCUMENTS

| | | | |
|---|---|---|---|
| DE | 9007396 U1 * | 7/1991 | |
| DE | 41 39 650 A1 | 6/1992 | |
| DE | 43 14 295 A1 | 11/1993 | |
| DE | 103 30 581 A1 | 3/2004 | |
| DE | 20 2004 001 293 U1 | 6/2004 | |
| DE | 10 2007 041 447 B3 | 4/2009 | |
| EP | 0 382 474 A2 | 8/1990 | |
| EP | 0 640 421 A2 | 3/1995 | |
| GB | 2 250 459 A | 6/1992 | |
| JP | 2002283112 A * | 10/2002 | |
| JP | 2005131742 A * | 5/2005 | |
| WO | WO 9322090 A1 * | 11/1993 | |
| WO | WO 0147658 A1 * | 7/2001 | |

OTHER PUBLICATIONS

Form PCT/ISA/210 International Search Report dated Nov. 28, 2011 with English translation of categories of documents cited (5 pages).
Search Report of German Patent Office issued in German Application No. 10 2010 041 336.4 dated Jun. 20, 2011 (5 pages).
Form PCT/IB/338 Notification of Transmittal of Translation of the International Preliminary Report dated Apr. 4, 2013 (1 page).
Form PCT/IB/373 Translation of International Preliminary Report dated Mar. 26, 2013 (1 page).
Form PCT/ISA/237 Translation of Written Opinion of the International Searching Authority (10 pages).

* cited by examiner

TOOL HEAD FOR USE IN MACHINE TOOLS

A tool head for use in machine tools having a base body which can be rotated about a rotational axis and having a slide which can be displaced via a pull rod, oriented axially in the base body, and can be fitted with at least one tool or a tool holder, at least one adjustable toothed plate being fixed on the slide, which adjustable toothed plate has a helical toothing system which acts as gear means for the engagement of a helical toothing system, complementary with respect to it, of the pull rod.

Tool heads of this type are used in machine tools for machining shaped elements, such as notches, undercuts, journals and bores. In principle, there can also be two or more slides on the tool head.

DE 43 14 295 A1 describes a tool head of this type. Said tool head has a base body which rotates about a rotational axis. The tool head comprises a slide. The slide serves as receptacle for a cutting tool. The slide is received in a linear guide. In the linear guide, the slide can be moved with a cutting tool along an adjusting axis which is radial with respect to the rotational axis. For adjusting the slide, the tool head has a pull rod. Said pull rod can be moved axially in the direction of the rotational axis. The pull rod has a helical toothing system which engages into a helical toothing system which is complementary with respect to it and is formed on the slide. By means of said toothing system, an axial movement of the pull rod is deflected into a radial movement of the slide.

For the precise machining of workpieces by way of a cutting tool which is received on a tool head of this type, it is necessary that the slide can be adjusted with the pull rod without play.

The slide is subjected to very great forces on the rotating machine spindle in a machine tool. Said forces are induced, in particular, by centrifugal forces and chipping forces which act on a tool, for example a cutting tool. The toothing system of pull rod and slide is loaded by said forces. This causes wear and leads to an undesirable adjusting play when the tool head is loaded heavily over relatively long time periods during the machining of workpieces by way of tools.

Proceeding herefrom, the invention is based on the object of providing a tool head with a slide, in which an undesirable play of the toothing system of slide and pull rod can be compensated for.

This object is achieved by a tool head of the type mentioned at the outset, in which tool head the slide has an adjusting device for moving the at least one toothed plate with its helical toothing system into the helical toothing system, complementary with respect to it, of the pull rod.

A tool head according to the invention can comprise not only one, but rather also two or more slides. The frictional forces which occur during the engagement of a pull rod helical toothing system into the helical toothing system of the toothed plate of a tool head slide cause material abrasion on the helical toothing systems of slide and pull rod during adjustment of the slide. One notion of the invention consists in that the material abrasion is produced only where faces of the oblique arrangements of the slide and pull rod make contact with one another. It is one concept of the invention that the gear play which is caused by said material abrasion can be compensated for by a toothed plate which has a helical toothing system being adjusted linearly on the slide with only one degree of mobility freedom.

In order to achieve this, the at least one toothed plate is guided in a linear guide which is formed on the slide. Said linear guide is oriented perpendicularly with respect to the adjusting direction of the slide. It is advantageous if the linear guide is configured as a parallel toothing system. By way of a parallel toothing system of this type, very great forces can be transmitted from the at least one toothed plate into the slide and vice versa.

For the movement of the at least one toothed plate on the slide, the adjusting device is coupled in the slide to a wedge mechanism, an eccentric gear mechanism or a screw mechanism. One preferred refinement of the invention provides that the adjusting device has an adjusting screw which is received in the slide and by means of which a movably arranged adjusting wedge can be displaced, which adjusting wedge acts on a wedge face which is formed on the at least one toothed plate. The at least one toothed plate can then be fixed releasably on the slide by way of at least one fastening means which is preferably configured as a fastening screw.

It is advantageous if a spring means which loads the at least one toothed plate with force is provided, in order to press the helical toothing system of the at least one toothed plate into the helical toothing system, complementary with respect to it, of the pull rod. The at least one toothed plate is preferably arranged in a recess which is formed on the base body and has a wall section which supports the spring means.

One improvement of the invention provides that the at least one toothed plate is loaded with force by a spring means which presses the toothed plate against the slide. It is advantageous in this case if the toothed plates are arranged in a recess which is formed on the base body and has a wall section which supports the spring means. Said spring means is preferably a resilient pressure piece which is received on the base body or the toothed plate with an active face which is supported on the base body or the toothed plate, and/or a ball thrust screw which is fastened to the base body or the toothed plate and has a movable ball body which is supported on the base body or the toothed plate. In particular, this makes the compensation of a play of the toothing system of slide and pull rod possible without complex measurement and adjustment, when the tool head is connected to the machine spindle of a machine tool.

For the movement of the slide with very high adjusting forces, it is advantageous if at least one first adjustable toothed plate is fastened to the slide, which toothed plate has a helical toothing system which acts as gear means for the engagement of a helical toothing system, complementary with respect to it, of the pull rod, and a second adjustable toothed plate is fixed on the slide, which second adjustable toothed plate has a helical toothing system which acts as gear means for the engagement of a helical toothing system, complementary with respect to it, of the pull rod. It is favorable here for the compensation of toothing play if the first toothed plate and the second toothed plate can be adjusted independently of one another.

According to the invention, an undesirable play of toothing system and pull rod in the tool head can be compensated for, in particular, as follows: in a first step, the at least one toothed plate is initially detached from the slide body. In a second step which follows this, the corresponding toothed plate is placed onto the slide in a positively locking manner. In a third step, the toothed plate on the slide is loaded with adjusting force via an adjusting device, in order to press the helical toothing system of the toothed plate into the helical toothing system, complementary with respect to it, of the pull rod. In a fourth step which follows the third step, the toothed plate is fixed on the slide in such a way that the toothed plate is fixed to the slide body in a non-positive manner. In a fifth step which follows the fourth step, the toothed plate is then loaded on the slide with adjusting force via the adjusting device, in order to fix the toothed plate to the slide in a positively locking manner.

In the following text, the invention will be explained in greater detail using one exemplary embodiment which is shown diagrammatically in the drawing, in which.

Figure 1:
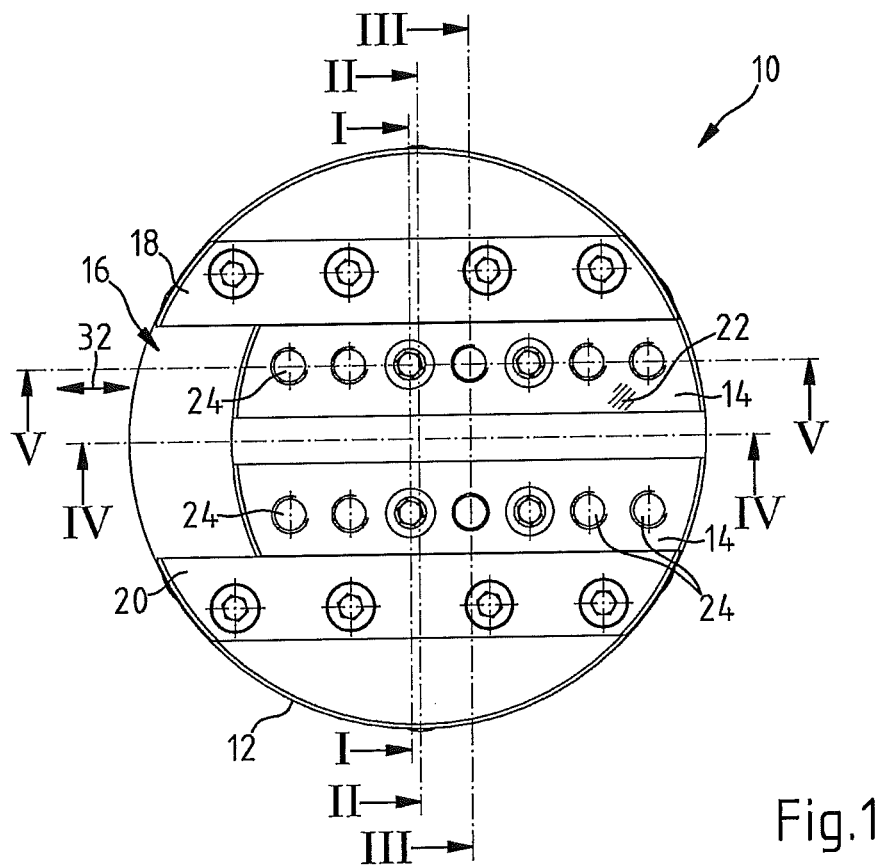
FIG. 1 shows the end side of a tool head in a plan view.
Figure 3:
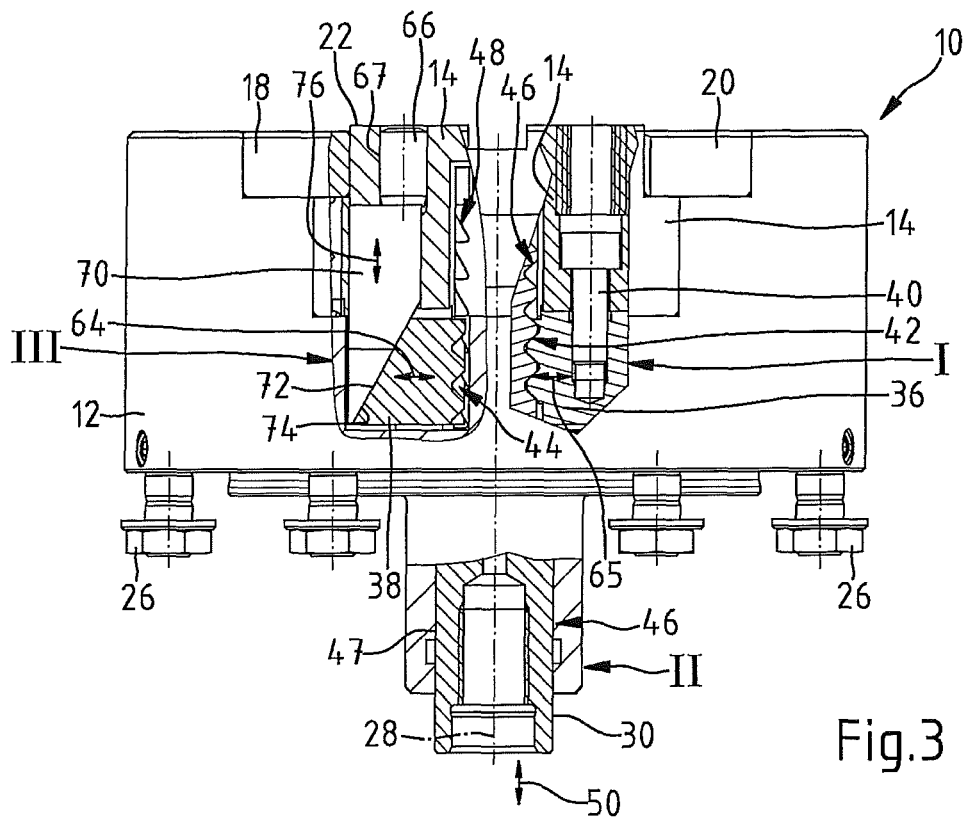
Figure 4:
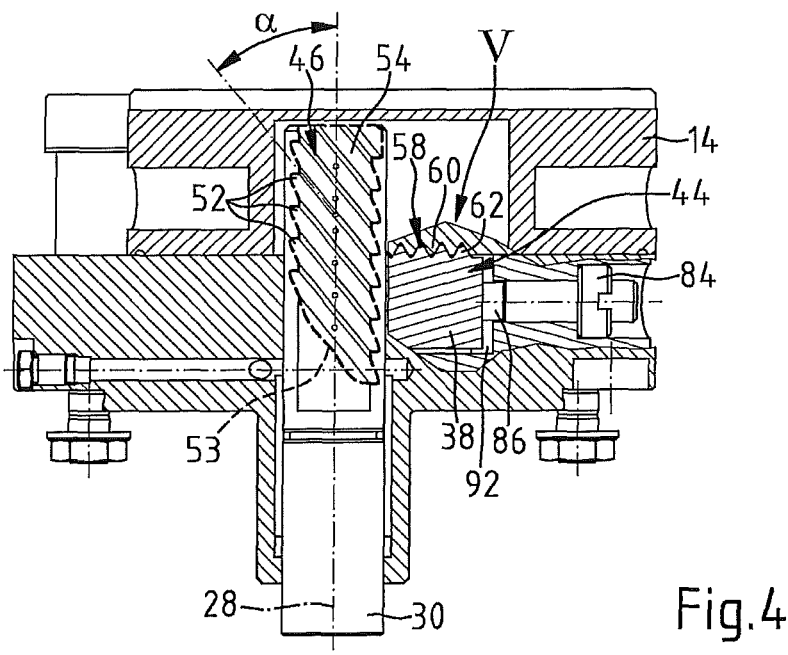
Figure 5A:
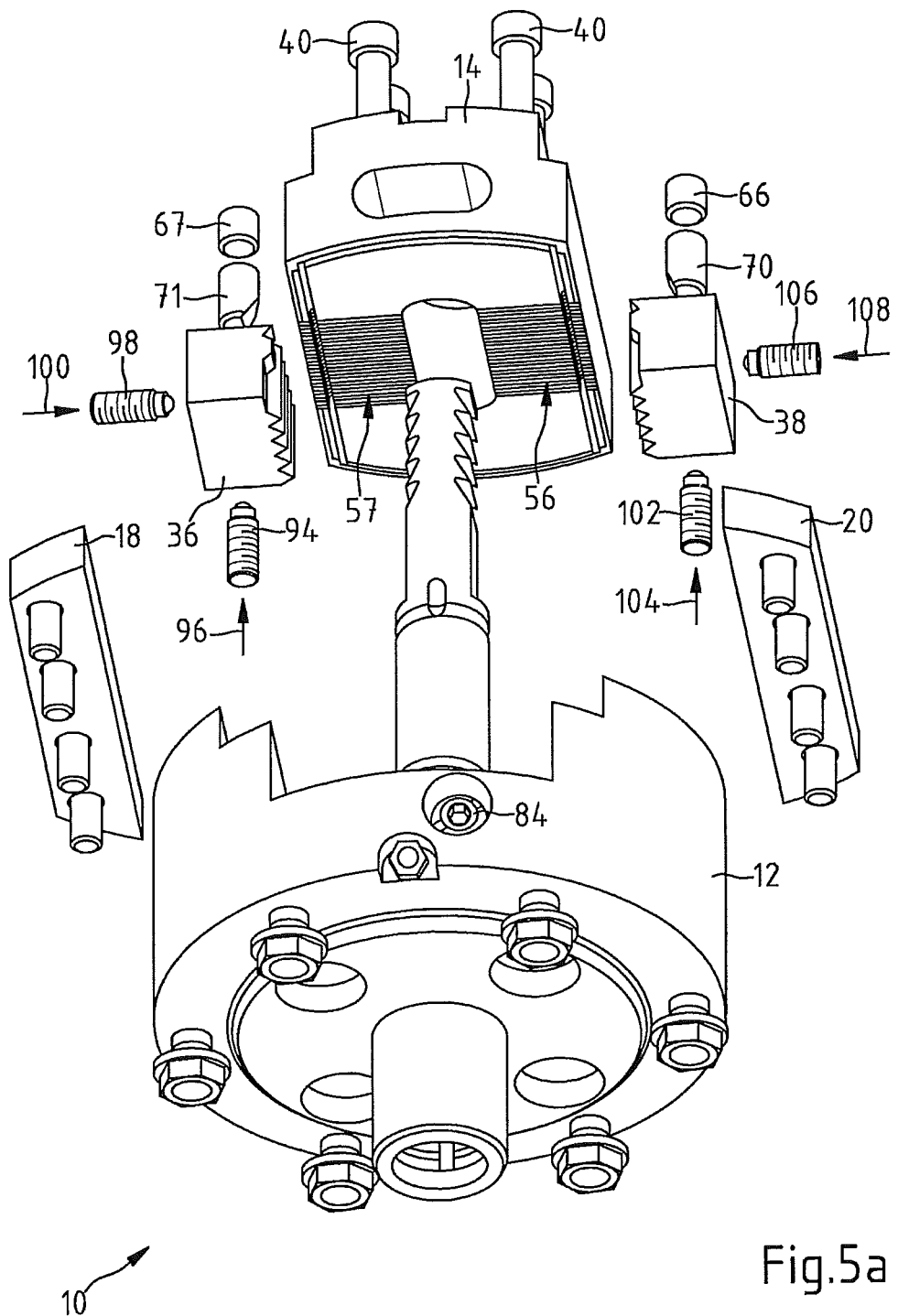
Figure 5B:
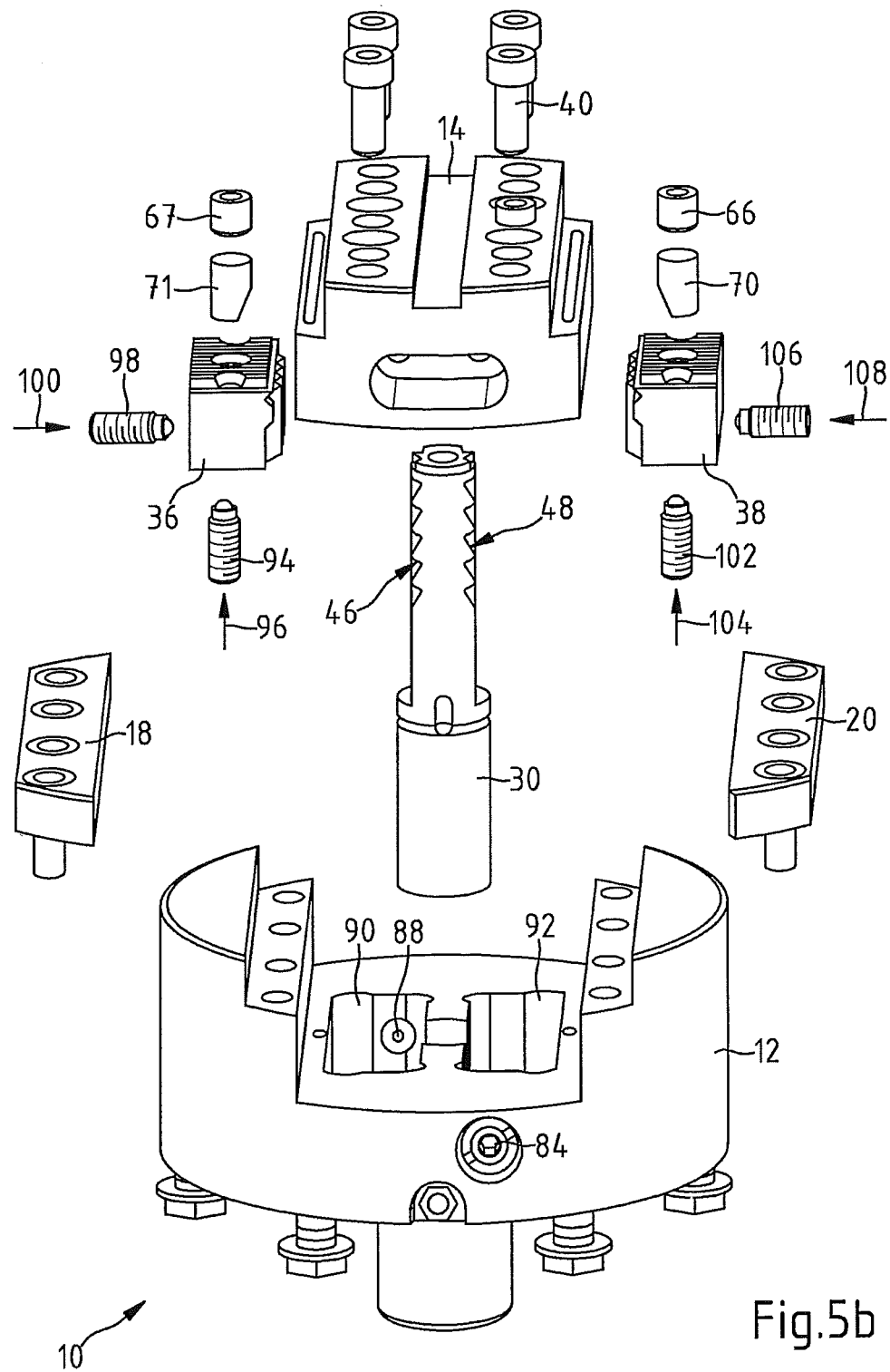
Figure 6:
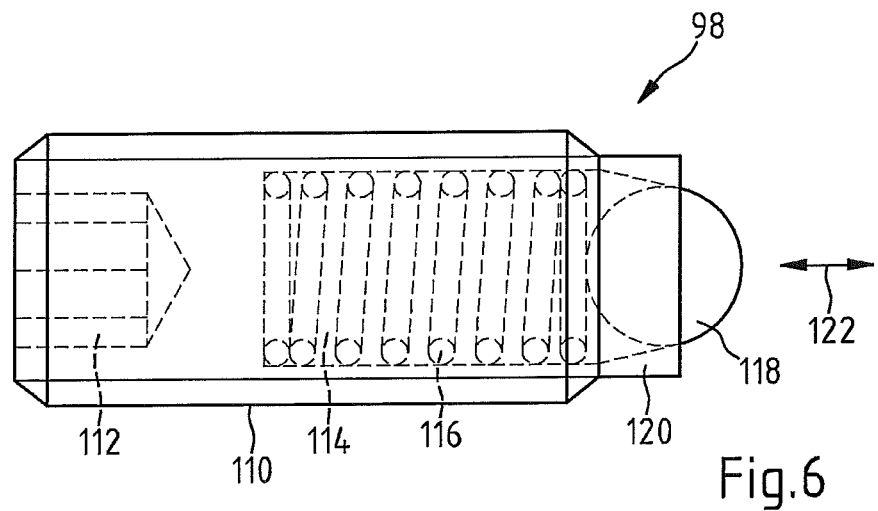
Figure 7:
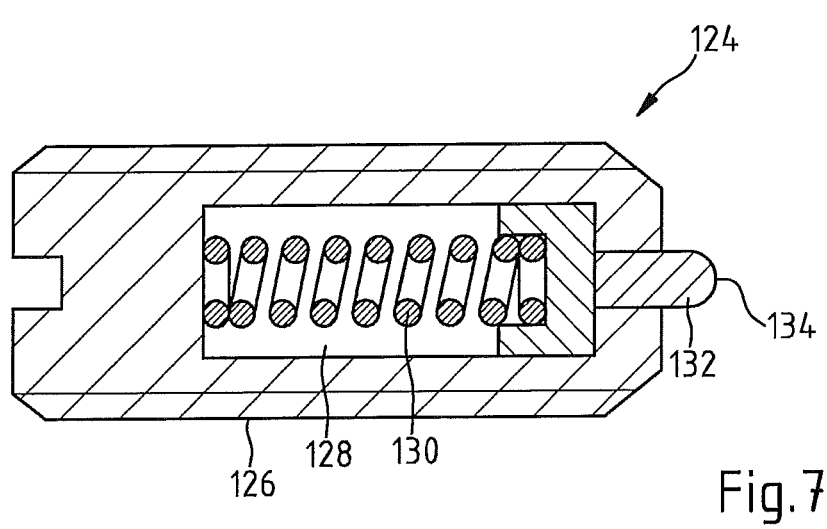

FIG. 3 shows a side view of the tool head with a plurality of part sections along the lines I-I, II-II and III-III from FIG. 1, FIG. 4 shows a section of the tool head along the line IV-IV with a part section along the line V-V from FIG. 1, FIG. 5*a* and FIG. 5*b* show an exploded illustration of the tool head with different viewing directions, FIG. 6 shows a ball thrust screw in the tool head, and FIG. 7 shows a resilient pressure piece for use in a tool head.

The tool head 10 shown in FIG. 1 has a base body 12. A movable slide 14 is received on the base body 12. The slide 14 is guided in a linearly movable manner in a sliding bearing 16 which is formed on the base body 12. The slide 14 is held in the sliding bearing 16 with a first bar 18 and with a second bar 20.

The slide 14 has a slide face 22 which can be fitted with a tool carrier for a cutting tool. For the connection of a tool carrier, there are a plurality of threaded holes 24 on the slide 14 for receiving fastening screws.

Figure 2:
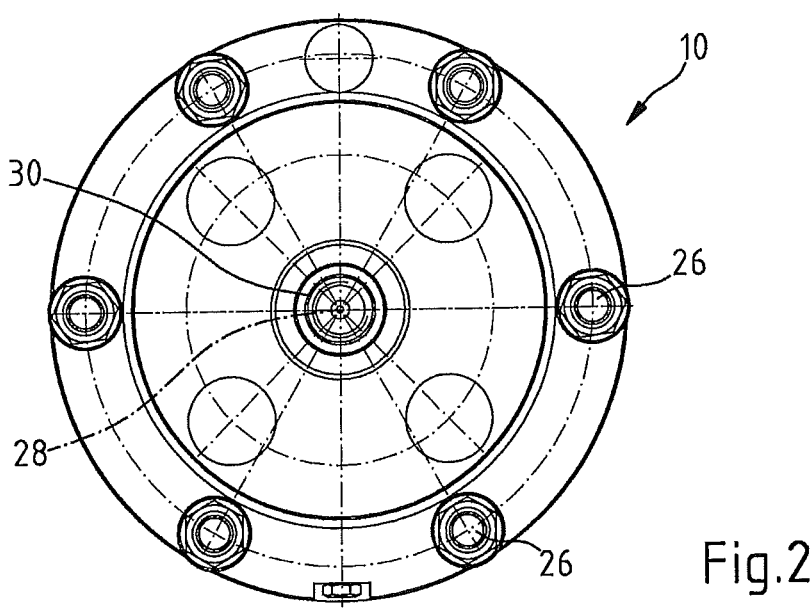
FIG. 2 shows the rear side of a tool head in a plan view.

FIG. 2 shows the rear side of the tool head 10. There are connection elements 26 on the rear side of the tool head 10. The tool head 10 can be connected by means of the connection elements 26 to the rotating machine spindle of a machine tool (not shown in further detail). The tool head 10 can be rotated on the machine spindle of a machine tool of this type at a high rotational speed about a rotational axis 28. The tool head 10 comprises a pull rod 30. The pull rod 30 is aligned with the rotational axis 28 of the tool head 10. The pull rod 30 can be displaced in the direction of the rotational axis 28. It is possible by way of displacement of the pull rod 30 to move the slide 14 in accordance with the double arrow 32 which is shown in FIG. 1.

FIG. 3 is a side view of the tool head 10 which comprises a plurality of part sections along the lines I-I, II-II and III-III from FIG. 1. There are a first toothed plate 36 and a second toothed plate 38 in the tool head 10. The toothed plates 36, 38 are arranged on a rear section of the slide 14 in a linear guide. The toothed plates 36, 38 can be fixed on the slide 12 by way of fastening screws 40. The toothed plate 36 has a helical toothing system 42. A helical toothing system 44 is formed in the toothed plate 38. The pull rod 30 is received in a linear guide 47 on the base body 12 of the tool head 10. The pull rod 30 has a first section with a helical toothing system 46. Said pull rod 30 has a second section, in which a helical toothing system 48 is formed.

The helical toothing system 46 of the pull rod 30 is complementary with respect to the helical toothing system 42 of the toothed plate 36. The helical toothing system 42 of the toothed plate 36 acts as gear means and is in engagement with the helical toothing system 46 of the pull rod 30. The helical toothing system 48 of the pull rod 30 is correspondingly complementary with respect to the helical toothing system 44 of the toothed plate 38. The helical toothing system 44 of the toothed plate 38 also acts as gear means and is in engagement with the helical toothing system 48 of the pull rod 30.

The toothed plates 36, 38 and the sections of the pull rod 30 with the helical toothing systems 46, 48 form a gear mechanism. By way of said gear mechanism, a movement (corresponding to the double arrow 50) of the pull rod 30 in the direction of the rotational axis 28 is converted into a radial movement of the slide 14, which radial movement is perpendicular with respect to the former movement. The direction of said radial movement of the slide 14 corresponds to the direction of the double arrow 32 in FIG. 1.

FIG. 4 is a section of the tool head along the line IV-IV from FIG. 1 which comprises a part section of the line V-V from FIG. 1. FIG. 4 shows the section of the pull rod 30 with the helical toothing system 46 and the toothed plate 38 with the helical toothing system 44. The helical toothing system 46 of the pull rod 30 has toothing ribs 52. The toothing ribs 52 of the helical toothing system 46 lie in a common plane 53. Said plane 53 is positioned offset laterally with respect to the rotational axis 28 of the tool head 10. The plane 53 is parallel to the rotational axis 28 of the tool head 10. The toothing ribs 52 of the helical toothing system 46 enclose, together with the perpendicular projection of the rotational axis 28 into said plane, the angle $\alpha=40°$. The toothing ribs 52 have flanks 54. The flanks 54 of the toothing ribs 52 are inclined with respect to the plane of the helical toothing system. The inclination angle $\beta$ for the flanks 54 of the toothing ribs 56 with respect to the plane 53 is $\beta=60°$. This applies correspondingly to the toothing ribs 56 of the helical toothing system 44 of the toothed plate 38 and to the toothing ribs of the helical toothing system 48 of the pull rod 30 and of the helical toothing system 42 of the toothed plate 36.

The toothed plates 36, 38 are received in recesses on the base body 12 of the tool head 10. FIG. 4 shows the recess 92 for the toothed plate 38. The base body 12 comprises a screw 84. The screw 84 has a stop piece 86 which protrudes into the recess 92. The stop piece 86 is a stop for the toothed plate 38. The movement travel for the slide 14 in the tool head 10, that is to say its stroke, can be set by means of the screw 84. The toothed plate 36 on the slide 14 is assigned a screw 88 which corresponds to the screw 84 and is fixed in the base body 12 of said tool head 10.

The linear guide of the toothed plates 36, 38 on the slide 14 is configured as a parallel toothing system. FIG. 4 shows the parallel toothing system 58 for the toothed plate 38 on the slide 14. The parallel toothing system 58 comprises a toothing system with toothing ribs 60 which extend in the slide 14. In a complementary manner with respect to this, there are toothing ribs 62 on the toothed plate 38. The toothing ribs 60 of the parallel toothing system 58 are arranged perpendicularly with respect to the plane of the toothing ribs of the helical toothing system 44 of the toothed plate 38. The toothing system which is formed on the toothed plate 38 with the toothing ribs 62 is in meshing engagement with the parallel toothing system 58 on the slide 14, which parallel toothing system 58 has the toothing ribs 60. This applies correspondingly to the linear guide of the toothed plate 36 on the slide 14, which linear guide is configured as a parallel toothing system. As a result of movement of the toothed plates 36, 38 in the parallel toothing systems, the helical toothing system 42, 44 of each toothed plate 36, 38 can be displaced relative to the helical toothing system 46, 48 of the pull rod 30 in accordance with the double arrows 64, 65 in FIG. 3. This makes it possible to move the helical toothing system of the toothed plates 36, 38 into the helical toothing system 42, 44, complementary with respect to it, of the pull rod 30.

There is an adjusting device in the slide 14 for the movement of the toothed plates 36, 38. FIG. 3 shows the adjusting device 66 for the toothed plate 36. The adjusting device 66 is an adjusting screw which is guided in a thread 67 in the slide 14 of the tool head 10. The adjusting screw 66 can be actuated from the slide face 22 by means of a setting tool. The adjusting screw 66 acts on a wedge mechanism with an adjusting wedge 70. The adjusting wedge 70 has a wedge face 72. The wedge face 72 lies on a wedge face 74, complementary with respect to it, on the toothed plate 38. As a result of movement of the adjusting screw 66 in the slide 14, the adjusting wedge 70 can be displaced in accordance with the arrow 76. As a result, the toothed plate 38 is pressed in the direction of the double arrow 64 against the helical toothing system 46 on the pull rod 30.

FIG. 5a and FIG. 5b show an exploded illustration of the tool head with different viewing directions.

The toothed plates 36, 38 are situated in the tool head 10 in recesses 90, 92 which are formed on the base body 12 of the tool head 10. In the recesses 90, 92, the toothed plates 36, 38 are loaded with spring force in each case in two spatial directions.

The toothed plate 36 is pressed into the parallel toothing system 57 on the slide 14 in the direction 96 by means of a ball thrust screw 94 which is fixed in the base body 12 of the tool head 10. Moreover, the toothed plate 36 is loaded with spring force in a direction 100 by a ball thrust screw 98 which is screwed into the base body 12, which direction 100 corresponds to the movement direction of the toothed plate 36 in the linear guide on the slide 14, which linear guide is configured as a parallel toothing system 57. Correspondingly, a ball thrust screw 102 which is fixed in the base body 12 of the tool head 10 acts on the toothed plate 38, by means of which ball thrust screw 102 the toothed plate 38 is pressed in the direction of the arrow 104 into the parallel toothing system 56 on the slide 14. Like the toothed plate 36, moreover, the toothed plate 38 is also loaded with spring force in a direction 108 by a ball thrust screw 106 which is screwed into a wall section of the recess 92 in the base body 12, which direction 108 corresponds to the movement direction of the toothed plate 38 in the linear guide on the slide 14, which linear guide is configured as a parallel toothing system 56.

FIG. 6 shows the ball thrust screw 98 in the tool head 10. The ball thrust screw 98 has a threaded body 110. An engagement means 112 for an adjusting key is formed on the threaded body 110. The threaded body 110 has a cavity 114, in which a compression spring 116 is positioned. The compression spring 116 acts on a ball 118 made from hardened metal. The ball 118 is held in a collar section 120 on the threaded body. The ball 118 can be displaced relative to the threaded body 110 in accordance with the double arrow 112. By means of the ball 118, the toothed plate 36 in the tool head 10 in FIG. 5a is pressed against the slide 14. Here, the ball 118 can roll on the toothed plate 36 when the slide 14 is displaced in the tool head 10. The ball thrust screws 94, 98, 102 and 106 are fixed in each case in a wall section of the recesses 90 or 92 in the base body 12 of the tool head 10.

The ball thrust screws 94, 102 and 106 in the tool head 10 in FIG. 5a are constructed like the ball thrust screw 98.

It is to be noted that ball thrust screws of this type can in principle also be screwed into the toothed plates 36, 38. The ball bodies of the screws then act on corresponding wall sections in the recesses for the toothed plate 36, 38, which recesses are formed in the base body 12 of the tool head.

The ball thrust screws 94, 98, 102, 106 ensure that the toothed plates 36, 38 are pressed automatically into the linear guides, formed as parallel toothing systems 56, 57, on the slide 14 and into the helical toothing system 46, 48 of the pull rod 30 when the fastening screws 40 for fixing the toothed plates 36, 38 on the slide 14 are released. This makes the compensation of an unexpected play of the toothing system of the toothed plates 36, 38 on the slide 14 and of the toothing system of the pull rod 30 possible, without it being necessary for the position of the toothed plates 36, 38 to be measured.

The gear mechanism, formed with the toothed plates 36, 38 and the helical toothing systems 44, 46 of the pull rod 30, in the tool head 10 can therefore even be set to a play-free state by actuation of the fastening screws 40 and the adjusting screws 66, 67 when the tool head 10 is connected to the machine spindle of a machine tool.

Here, the setting of a toothed plate 36, 38 to a play-free state in the above-described tool head 10 can be carried out as follows:

1st step: opening and slight attaching of the fastening screws 40 for a toothed plate 36, 38. A toothed plate 36, 38 bears against the slide 14 in the linear guide which is configured as a parallel toothing system 56, 57. The toothed plates 36, 38 can thus be displaced in the linear guide of the parallel toothing system 56, 57 without tilting.

2nd step: adjustment of the adjusting screw 66, 67, in order to set a desired position for a toothed plate 36, 38 by movement of the wedge mechanism with the adjusting wedges 70 and 71.

3rd step: tightening of the fastening screws 40 with a nominal torque. As a result, a toothed plate 36, 38 is fixed by way of a non-positive connection in the desired position on the slide 14.

4th step: loading of the adjusting screw 66 and 67 with a predefined torque. This brings about a positively locking connection of a corresponding toothed plate 36, 38 with the slide 14. In this way, the immovability of the toothed plate 36, 38 is ensured.

FIG. 7 shows a resilient pressure piece 124. By way of this, a toothed plate in the above-described tool head can be pressed against the slide in the tool head in a similar manner as by way of a ball thrust screw. The resilient pressure piece 124 has a threaded body 126 with a cavity 128. A compression spring 130 which acts on a contact piece 132 is arranged in the cavity 128. The contact piece 132 has an active face 134. The active face 134 bears against a side face of a toothed plate in the slide, in order to press the toothed plate against the slide or against the toothing system of the pull rod in the tool head. As has been described in the preceding text with respect to the ball thrust screws which are arranged in the tool head, a resilient pressure piece of this type can also be fixed, however, in a toothed plate in the tool head. In this case, the contact piece of the resilient pressure piece, like the ball body of the ball thrust screw, is supported against a wall section of the receptacle for a toothed plate in the housing body of the tool head.

In summary, the following is to be noted: the invention relates to a tool head 10 for use in machine tools with a base body 12 which can be rotated about a rotational axis 28. The tool head 10 has a slide 14. The slide 14 can be displaced by way of a pull rod 30 which is oriented axially in the base body 12. The slide 14 can be fitted with at least one tool or a tool holder. At least one adjustable toothed plate 36, 38 is fixed on the slide 14. The toothed plate 36, 38 has a helical toothing system 42, 44 which acts as gear means for the engagement of a helical toothing system 44, 48, complementary with respect to it, of the pull rod 30. The slide 14 has an adjusting device 66 for moving the at least one toothed plate 36, 38 with its helical toothing system 42, 44 into the helical toothing system 44, 48, complementary with respect to it, of the pull rod 30.

The invention claimed is:

1. A tool head for use in machine tools having a base body which can be rotated about a rotational axis and having a slide which can be displaced via a pull rod, oriented axially in the base body, and can be fitted with at least one tool or a tool holder, it being possible for at least one adjustable toothed plate to be fixed on the slide, which at least one adjustable toothed plate has at least one first toothing system which acts as gear means for the engagement of at least one second toothing system, complementary with respect to it, of the pull rod, and the slide comprising an adjusting device for moving the at least one toothed plate with its at least one first toothing system into the at least one second toothing system, complementary with respect to it, of the pull rod, characterized in that the adjusting device has an adjusting screw which is received in the slide and by means of which a movably arranged adjusting wedge can be displaced, which adjusting wedge acts on a wedge face which is formed on the at least one toothed plate.

2. The tool head as claimed in claim 1, characterized in that a spring means which loads the at least one toothed plate with force is provided, in order to press the at least one toothed plate against the slide.

3. The tool head as claimed in claim 2, characterized in that the at least one toothed plate is arranged in a recess which is formed on the base body and has a wall section which supports the spring means.

4. A tool head for use in machine tools having a base body which can be rotated about a rotational axis and having a slide which can be displaced via a pull rod, oriented axially in the base body, and can be fitted with at least one tool or a tool holder, it being possible for at least one adjustable toothed plate to be fixed on the slide, which at least one adjustable toothed plate has at least one first toothing system which acts as gear means for the engagement of at least one second toothing system, complementary with respect to it, of the pull rod, and the slide comprising an adjusting device for moving the at least one toothed plate with its at least one first toothing system into the at least one second toothing system, complementary with respect to it, of the pull rod, characterized in that a spring means which loads the at least one toothed plate with force is provided, in order to press the at least one first toothing system of the at least one toothed plate into the at least one second toothing system, complementary with respect to it, of the pull rod.

5. The tool head as claimed in claim 4, characterized in that the adjusting device has an adjusting screw which is received in the slide and by means of which a movably arranged adjusting wedge can be displaced, which adjusting wedge acts on a wedge face which is formed on the at least one toothed plate.

6. The tool head as claimed in claim 4, characterized in that the at least one toothed plate is arranged in a recess which is formed on the base body and has a wall section which supports the spring means.

7. The tool head as claimed in claim 2, characterized in that the spring means is a resilient pressure piece which is received on the base body or the at least one toothed plate with an active face which is supported on the base body or the at least one toothed plate, and/or a ball thrust screw which is fastened to the base body or the at least one toothed plate with a movable ball body which is supported on the base body or the toothed plate.

8. The tool head as claimed in claim 1, characterized in that the at least one toothed plate can be fixed releasably on the slide by way of at least one fastening means.

9. The tool head as claimed in claim 1, characterized in that at least one first adjustable toothed plate is fixed on the slide, which toothed plate has a first toothing system which acts as gear means for the engagement of a second toothing system, complementary with respect to it, of the pull rod, and a second adjustable toothed plate is fixed on the slide, which second adjustable toothed plate has a first toothing system which acts as gear means for the engagement of a second toothing system, complementary with respect to it, of the pull rod.

10. The tool head as claimed in claim 9, characterized in that the first toothed plate and the second toothed plate can be adjusted independently of one another.

11. The tool head as claimed in claim 1, characterized in that the at least one toothed plate is guided in a linear guide which is formed on the slide.

12. The tool head as claimed in claim 11, characterized in that the linear guide is oriented perpendicularly with respect to the adjusting direction of the slide.

13. The tool head as claimed in claim 11, characterized in that the linear guide is a parallel toothing system.

14. The tool head as claimed in claim 11, characterized in that the adjusting device is coupled to a wedge mechanism.

15. A method for compensating for an undesirable play of a toothing system and pull rod in a tool head which is configured as claimed in claim 1, comprising, in a first step, detaching the at least one toothed plate from the slide, in a second step, placing the at least one toothed plate onto the slide in a positively locking manner, in a third step, loading the at least one toothed plate on the slide with an adjusting force via an adjusting device, in order to press the at least one first toothing system into the at least one second toothing system, complementary with respect to them, of the pull rod, in a fourth step, fixing the at least one toothed plate on the slide in such a way that the at least one toothed plate is fixed to the slide in a non-positive manner, and in a fifth step, loading the at least one toothed plate against the slide with an adjusting force via the adjusting device, in order to fix the at least one toothed plate to the slide in a positively locking manner.

* * * * *